SELF-SYNCHRONIZING DELAY LINE DATA RECIRCULATION LOOP

Filed Oct. 1, 1963 2 Sheets-Sheet 1

INVENTORS.
JAMES G. PEARCE
HILLEL PITLIK
GUENTER SAGER
BY Robert L. Nathans
ATTORNEY 3,164,809
Patented Jan. 5, 1965

3,164,809
SELF-SYNCHRONIZING DELAY LINE DATA RECIRCULATION LOOP

James Gordon Pearce, Webster, Hillel Pitlik, Rochester, and Guenter Sager, Fairport, N.Y., assignors to General Dynamics Corporation, Rochester, N.Y., a corporation of Delaware Filed Oct. 1, 1963, Ser. No. 312,961
6 Claims. (Cl. 340—173)

The present invention relates to delay line data storage systems and, more particularly, data storage systems employing a single delay line data store which generates its own clock.

In various types of prior art data handling equipment, it is necessary to provide a store for serially storing information which may be in the form of binary bits or multi-frequency signals. A shift register or delay line is often employed having its output circuit coupled to its input circuit through a recirculation path. A fixed frequency external clock operates in conjunction with an AND gate at the input to the delay line to reshape the recirculating pulses and to maintain them in synchronism with the rest of the system. The clock also synchronously enables the read-in and read-out AND gates so that the proper groups of bits, or words, are read out of the recirculation loop and are read back into the loop at the proper times within the cycle. A delay line is generally employed where a large number of bits are to be retained in the store rather than a shift register, since shift registers having thousands of stages are expensive and cumbersome. However, delay lines are subject to variations in delay time with temperature variations, which variations can cause jumbling of information upon read-in and read-out where an external clock is used.

Accordingly, it is the principal object of the present invention to provide a new and improved delay line data storage system.

It is a further object of the present invention to provide a serial type data storage system utilizing a single delay line which eliminates the use of a fixed frequency external clock, but rather generates its own clock pulse train which will vary in frequency and phase in step with variations in the delay time of the line so that jumbling of words during read-in, read-out, and recirculation is avoided.

The foregoing and other advantages of the invention will be better understood as the following description proceeds, and the features of novelty which characterize the invention will be pointed out with particularity in the claims annexed to and forming a part of this specification.

Figure 1:
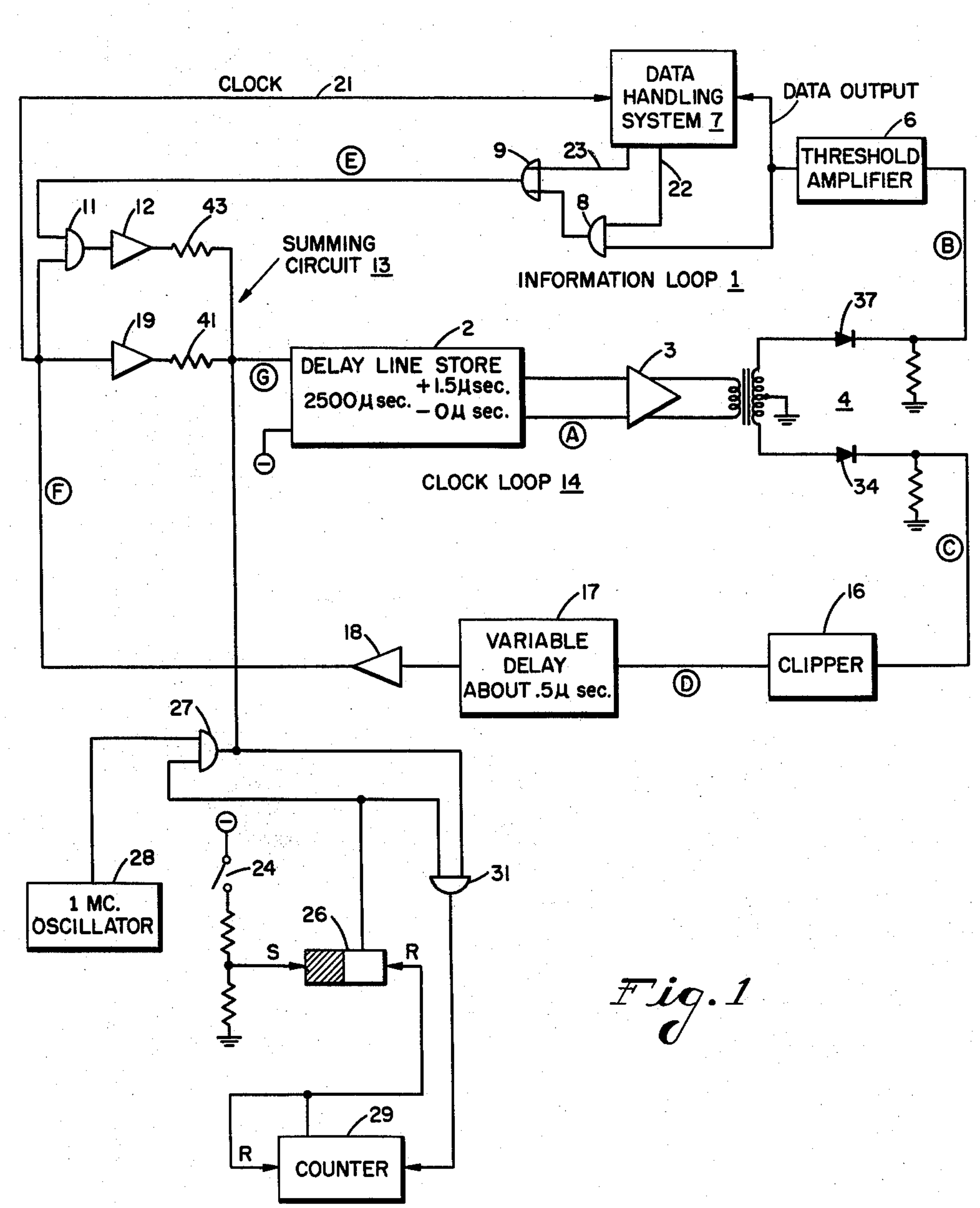

Further objects and advantages of the present invention will become apparent with reference to the following specification and drawings in which:

FIG. 1 discloses a preferred embodiment of the present invention; and

Figure 2:
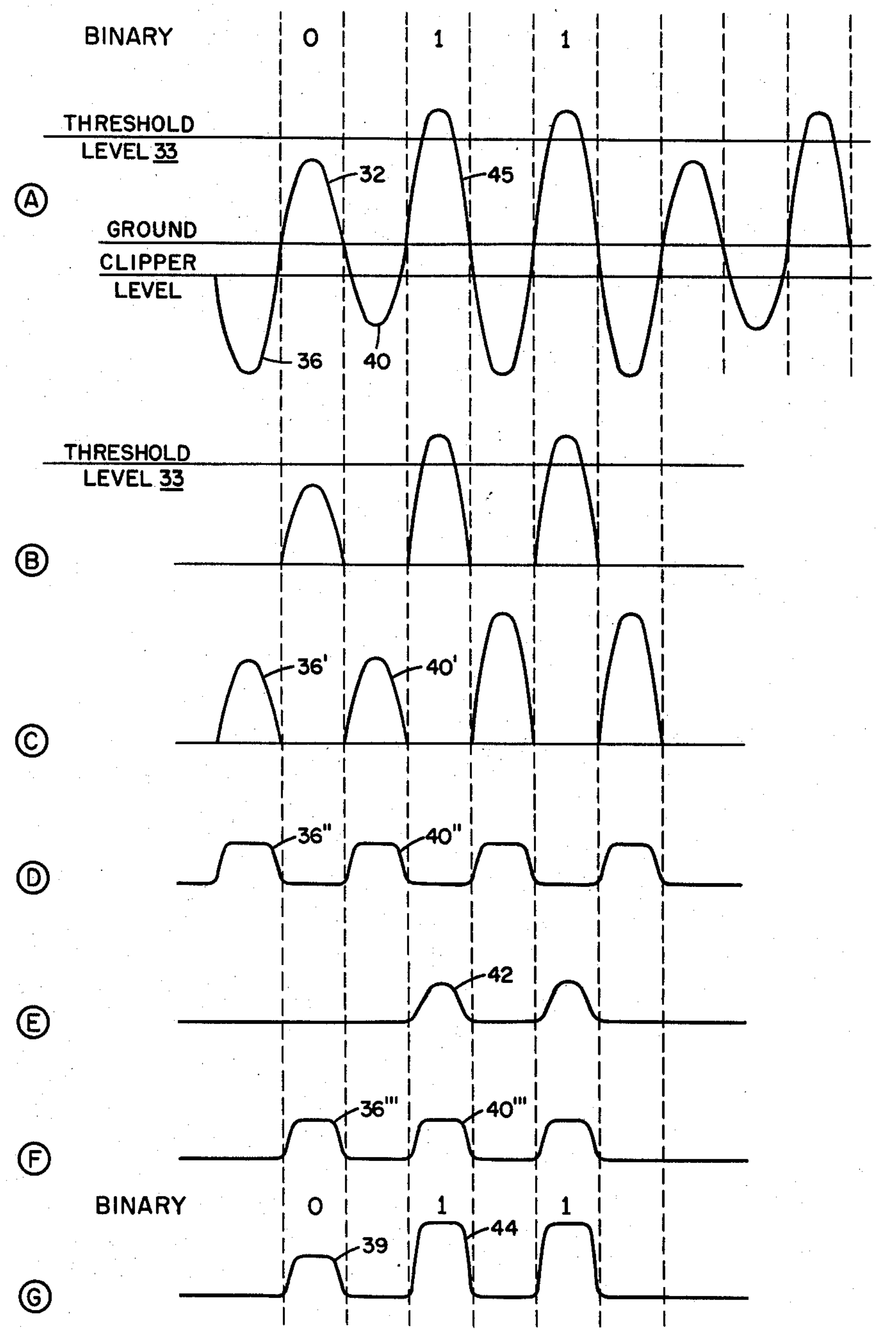

FIG. 2 discloses a pulse diagram which will be useful in the understanding of the operation of the preferred embodiment of FIG. 1.

In accordance with the present invention, a pulse train is generated and inserted into the delay line having intertwined information and timing or clock portions. The information portions will be modulated by read-in circuitry from time to time or may be recirculated without being altered. The aforementioned jumbling of words which may result when a fixed frequency external clock is utilized to actuate the read-in and read-out gates at particular times within each cycle is avoided by having the clock pulses generated by the timing portions of the recirculating pulse train. Accordingly, any slowing up of the information or data portions passing through the line will also cause a proportional reduction in the frequency of the generated clock pulse train so that the system will always be in synchronization and jumbling is consequently avoided.

Referring now to FIG. 1, an information loop 1 is disclosed, which loop comprises a delay line store 2, an amplifier 3, a rectifier 4, a threshold amplifier 6, a data handling system 7, a recirculation AND gate 8, an OR gate 9, an AND gate 11, an amplifier 12, and a summing circuit 13. A clock loop 14 is shown, comprising delay line 2, amplifier 3, rectifier 4, clipper 16, variable delay means 17, amplifier 18, amplifier 19, and summing circuit 13.

Data handling system 7 is shown schematically since it forms no part of the present invention. For the details of such a system, see United States patent application Serial No. 300,557 of James Gordon Pearce and Allan Curtis Tetrault, filed August 7, 1963, entitled "Electronic Register Sender," which is assigned to the same assignee as that of the present invention. For the purposes of this disclosure, data handling system 7 may be considered a source of binary data, the programming of which is controlled by the clock pulses produced on lead 21. If it is desired merely to recirculate binary information contained within delay line 2 without changing the information, a mark is continuously produced upon lead 22 so that recirculation AND gate 8 remains fully enabled. If it is desired to erase various recirculating words, this mark is removed from lead 22 thereby to disenable AND gate 8. At this time, or at other times, information may be written into the system via lead 23, at intervals within the cycle controlled by the clock signals applied over lead 21. As can be seen from the inspection of the aforesaid patent application, these clock signals are utilized to drive a timing bit generator which enables read-in and read-out gating circuits during these intervals.

Let it be assumed that the embodiment of FIG. 1 is designed to store 2500 binary bits of information in serial form and that the stepping rate of each bit through the system is one megacycle. Each bit, therefore, will occupy a time slot within the line having a "length" or duration of one microsecond and will recirculate once every 2.5 milliseconds. In view of the aforesaid variations in delay time, the specification of the delay line store will be 2500 microseconds minus zero microseconds and plus some quantity which could be 1.5 microseconds or more. The actuation of switch 24 causes flip-flop 26 to become set, thereby to enable AND gate 27. This action causes the A.C. signal produced by one megacycle oscillator 28 to be applied to delay line 2. These pulses are also applied to counter 29 through presently enabled AND gate 31. When a count of twenty-five hundred is registered within counter 29, the counter resets itself and also causes flip-flop 26 to become reset, thereby to disenable AND gate 27. Flip-flop 26 remains reset until initial write-in is again desired after delay line 2 is cleared. AND gate 31 is also disenabled at this time sc that the recirculating pulses do not further actuate counter 29.

Binary ones are inserted into the system via lead 23, thereby to cause the pulse train within delay line 2 to be modulated, as shown in FIG. 2A. This modulation process will become clearer as the description proceeds. The pulse train of FIG. 2A is applied to full-wave rectifier 4 by way of amplifier 3. The positive-going portions of FIG. 2A represent the intelligence bearing or information portions, while the negative-going portions represent the timing or clock portions. As mentioned hereinabove, any variations in the delay time of the information portions will, of course, be equal to variations in delay time of the timing portions.

Let it be assumed that pulse 32 of FIG. 2A is now being applied to full-wave rectifier 4. Pulse 32 will pass through rectifier 4 and will be applied to threshold amplifier 6. However, since threshold level 33 has not been exceeded, no signal will be produced at the output circuit of threshold amplifier 6 thereby to indicate the manifestation of a binary zero. Recirculation AND gate 8, which is now partially enabled by the application of a mark over lead 22, will, accordingly, not become fully enabled and, as a result AND gate 11 is disenabled at this time. It should be noted that pulse 32 will not be applied to clock loop 14 owing to back-biased rectifier 34 of full-wave rectifier 4. Negative-going portion 36 will not be applied to information loop 1 owing to back-biased rectifier 37, but will be inverted (36' of FIG. 2C) and applied to clipper 16 since diode 34 will be forward biased at this time. The waveforms applied to clipper 16 at point C is shown by FIG. 2C, just as the waveforms applied to threshold amplifier 6 at point B is shown, in FIG. 2B. The amplitudes of the negative-going timing portions, such as 36, are of no significance and these portions are clipped as indicated by 36'' of FIG. 2D. Variable delay means 17 is utilized to delay 36'' of FIG. 2D about .5 microsecond thereby to produce 36''' of FIG. 2F. Therefore, it should be apparent that the timing portions at point F will coincide in time with those information portions manifested at point E. Since pulse 32 represents a binary zero, no signal is applied to the upper branch of summing circuit 13 since AND gate 11 is disenabled as explained hereinbefore. However, at this time, 36''', shown in FIG. 2F, is applied to the lower branch of summing circuit 13, thereby to cause a relatively low amplitude impulse 39 to be inserted into delay line 2.

Now let it be assumed that binary one pulse 45, shown in FIG. 2A, is applied to rectifier 4 and, as a result, a bit is produced by threshold amplifier 6, which bit passes through recirculation AND gate 8 and is applied to AND gate 11. Negative-going portion 40 has previously been clipped by clipper 16 and is represented by 40'' in FIG. 2D. Pulse 40''' (of FIG. 2F) emerges from delay means 17 and is applied to the lower terminal of AND gate 11 coincidentally with the manifestation of the binary one at the upper terminal of AND gate 11. As in the previously discussed case of the manifestation of a binary zero, current flows through resistor 41 due to the clock impulse which is always applied at point F. However, at this time AND gate 11 is fully enabled owing to the binary one impulse 42, shown at FIG. 2E, and accordingly, current will also flow through resistor 43 and, as a result, these currents are summed by summing circuit 13 to produce a relatively high amplitude impulse 44, shown at FIG. 2G, which impulse is inserted into the delay line 2. The waveform of the pulses of FIG. 2G will be altered somewhat by the delay line so that the ouput of the line will look more nearly like FIG. 2A. The delay time of delay means 17 will be roughly .5 microsecond or one-half of a cycle so that pulse 40''' will coincide with pulse 42.

In summary, rectifier 4 is utilized to steer the positive-going information portions of the A.C. wave to the information loop 1, and is utilized to steer the negative-going clock or timing portions to the clock loop 14. Variable delay means 17 is utilized to delay the timing portions so that they are coincident in time with the information portions when said information portions are applied to the summing circuit. The summing circuit causes a relatively high amplitude impulse to be inserted into the delay line store where a binary one is applied to the summing circuit via the information loop and causes a relatively low amplitude impulse to be introduced into delay line 2 where a binary zero is applied to the summing circuit. It should be apparent at this time that any variations in delay of the positive-going information portions will also cause corresponding variations in delay of the timing portions so that the delay line serial type store of the present invention generates its own clock which is utilized for recirculating, reading out and reading in of information at exactly the right times within the cycle regardless of the aforesaid variations.

It should be obvious that the present invention is not restricted to amplitude modulation to indicate binary ones or binary zeros. If desired, signals of different frequencies may be utilized to indicate the make-up of circulating information. If such is the case, full-wave rectifier 4 will be replaced by a pair of filters which would differentiate between the timing portions and the information portions. A filter associated with threshold amplifier 6 could be ultilized to further distinguish between binary ones and binary zeros which would be represented by two different frequencies.

For the purposes of this disclosure, the term "delay line" means any delay device which could conceivably subject information passing therethrough to variations in delay time.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In a delay line data storage system, an information loop, a clock loop, a delay line common to said information loop and said clock loop for storing a pulse train having first intelligence bearing portions including first and second types of signals and second timing portions intertwined with said first intelligence bearing portions, a write-in circuit common to both of said loops, means within said information loop for forwarding signals representative of said first portions emerging from said delay line to said write-in circuit, means within said clock loop for forwarding signals representative of said second portions emerging from said delay line to said write-in circuit substantially coincident with the forwarding of said signals representative of said first portions to said write-in circuit by said means for forwarding within said information loop, said write-in circuit further including means for causing first types of signals to be inserted into said delay line in response to the application of said second portions to said write-in circuit via said clock loop where signals representative of first types of signals are simultaneously applied to said write-in circuit via said information loop and for causing second types of signals to be introduced into said delay line in response to the application of said second portions to said write-in circuit via said clock loop where signals representative of second types of signals are simultaneously applied to said write-in circuit via said information loop.

2. In a delay line data storage system, an information loop, a clock loop, a delay line common to said information loop and said clock loop for storing a pulse train having first intelligence bearing portions including first and second types of signals and second timing portions intertwined with said first intelligence bearing portions, a first write-in circuit for initially writing in said pulse train into said delay line, a second write-in circuit common to both of said loops, means within said information loop for forwarding signals representative of said first portions emerging from said delay line to said second write-in circuit, means within said clock loop for forwarding signals representative of said second portions emerging from said delay line to said second write-in circuit substantially coincident with the forwarding of said signals representative of said first portions to said second write-in circuit by said means for forwarding within said information loop, said second write-in circuit further including means for causing first types of signals to be inserted into said delay line in response to the application of said second portions to said second write-in circuit via said clock loop where signals representative of first types of signals are simultaneously applied to said second write-in circuit via said information loop and for causing second types of signals to be introduced into said delay line in response to the application of said second portions to said write-in circuit via said clock loop where signals representative of second types of signals are simultaneously applied to said write-in circuit via said information loop.

3. In a delay line data storage system, an information loop, a clock loop, a delay line common to said information loop and said clock loop for storing a pulse train having first intelligence bearing portions and second timing portions intertwined with said first intelligence bearing portions, a write-in circuit common to both of said loops, means within said information loop for forwarding signals representative of said first portions emerging from said delay line to said second write-in circuit, means within said clock loop for forwarding signals representative of said second portions emerging from said delay line to said second write-in circuit substantially coincident with the forwarding of said signals representative of said first portions to said second write-in circuit by said means for forwarding within said information loop, said second write-in circuit further including means for causing relatively high amplitude signals to be inserted into said delay line in response to the application of said second portions to said write-in circuit via said clock loop where relatively high amplitude signals are simultaneously applied to said write-in circuit via said information loop and for causing relatively low amplitude signals to be introduced into said delay line in response to the application of said second portions to said write-in circuit via said clock loop where relatively low amplitude signals are simultaneously applied to said write-in circuit via said information loop.

4. The combination as set forth in claim 3 wherein said write-in circuit further includes a summing circuit.

5. In a delay line data storage system, an information loop, a clock loop, a delay line common to said information loop and said clock loop for storing a pulse train having first intelligence bearing portions and second timing portions intertwined with said first intelligence bearing portions, a first write-in circuit for initially writing in said pulse train into said delay line, a second write-in circuit common to both of said loops, means within said information loop for forwarding signals representative of said first portions emerging from said delay line to said second write-in circuit, means within said clock loop for forwarding signals representative of said second portions emerging from said delay line to said second write-in circuit substantially coincident with the forwarding of said signals representative of said first portions to said second write-in circuit by said means for forwarding within said information loop, said second write-in circuit further including means for causing relatively high amplitude signals to be inserted into said delay line in response to the application of said second portions to said second write-in circuit via said clock loop where relatively high amplitude signals are simultaneously applied to said second write-in circuit via said information loop and for causing relatively low amplitude signals to be introduced into said delay line in response to the application of said second portions to said write-in circuit via said clock loop where relatively low amplitude signals are simultaneously applied to said write-in circuit via said information loop.

6. The combination as set forth in claim 5 wherein said second write-in circuit further includes a summing circuit.

References Cited in the file of this patent

UNITED STATES PATENTS 3,107,344 Baker ---------------- Oct. 15, 1963